United States Patent [19]

Asai

[11] Patent Number: 5,473,319
[45] Date of Patent: Dec. 5, 1995

[54] PAGING RECEIVER

[75] Inventor: Takayuki Asai, Tokyo, Japan

[73] Assignee: NEC Corporation, Tokyo, Japan

[21] Appl. No.: 202,063

[22] Filed: Feb. 25, 1994

[51] Int. Cl.$^6$ ........................................... H24B 1/16
[52] U.S. Cl. ..................... 340/825.44; 455/38.3
[58] Field of Search ................ 340/825.44, 825.47; 455/38.3, 343

[56] References Cited

U.S. PATENT DOCUMENTS 5,140,698  8/1992  Toko ................................. 340/825.44

FOREIGN PATENT DOCUMENTS

91/19357  12/1991  WIPO .

Primary Examiner—Michael Horabik
Attorney, Agent, or Firm—Sughrue, Mion, Zinn, Macpeak & Seas

[57] ABSTRACT

The rise-up time of an intermediate frequency signal generated in a radio receiving unit is detected at each time in intermittent receiving operation. The radio receiving unit is turned on for a period including the rise-up time and a time of the intermittent receiving operation. Consequently, the electric power consumption of a battery for a power supply of the radio receiving unit is decreased.

4 Claims, 6 Drawing Sheets

PAGING RECEIVER

FIELD OF THE INVENTION

This invention relates to a paging receiver, and more particularly to, a control apparatus for suppressing the consumption of electric power in a stabilizing power supply in a paging receiver.

BACKGROUND OF THE INVENTION

In a conventional paging receiver, a selective call is carried out by adopting time-divisional frames provided subsequent to a preamble and a synchronization code, wherein one of the frames is assigned to a corresponding one of paging receivers.

In the conventional paging receiver, a voltage is applied from a stabilizing power supply to a radio receiving unit to receive a selective call signal for a period of a frame assigned to the paging receiver and a ready period preceding the period of the assigned frame. Thus, a RF amplifier, a local oscillator, a demodulator, etc. in the radio receiving unit start to be risen-up for an intermittent receiving operation to be followed by being applied with a voltage rising up in level during the ready period, and is stabilized to demodulate the selective call signal by being applied with a voltage completely risen-up in level during the period of the assigned frame. Consequently, the electric power consumption in the stabilizing power supply is suppressed to some extent in the paging receiver by adopting the intermittent receiving operation.

In the conventional paging receiver, however, there is a disadvantage in that there is limitation in the suppression of the electric power consumption, because the ready period is fixed to have an appropriate margin of time in view of the situation where the rising-up period of a voltage to be supplied to the radio receiving unit is different among paging receivers. This results in the short life of batteries.

SUMMARY OF THE INVENTION

Accordingly, it is an object of the invention to provide a paging receiver in which the long life of a battery is expected.

According to the feature of the invention, a paging receiver, comprises:

means for receiving a radio frequency signal to generate a demodulation signal thereof;

means for processing the demodulation signal to externally represent information included in the radio frequency signal;

and means for controlling the receiving means to be intermittently turned on for a rise-up time of the receiving means and a receiving time specified in an intermittent operation format, the rise-up time being detected by the controlling means, and the receiving time being successively subsequent to the rise-up time.

According to the different feature of the invention, a paging receiver, comprises:

a radio receiving unit for generating a demodulated signal by demodulating an intermediate frequency signal obtained by mixing a local oscillation signal generated in a local oscillator and a transmitted radio signal;

a decoder for decoding the demodulated signal comparing the ID code in the decoded signal with the one in the ID-ROM, and generating the alert signal if they are identical;

means for representing information in accordance with the ID code in the decoded signal;

means for detecting a rise-up time of the local oscillator; and means for controlling the radio receiver unit to be turned on intermittently during the rise-up time and a prescribed selective receiving time.

BRIEF DESCRIPTION OF THE DRAWINGS

The invention will be explained in more detail in conjunction with appended drawings, wherein.

DESCRIPTION OF THE PREFERRED EMBODIMENTS

Before explaining a paging receiver in the preferred embodiment according to the invention, the conventional paging receiver will be explained in FIGS. 1 and 2.

Figure 1:
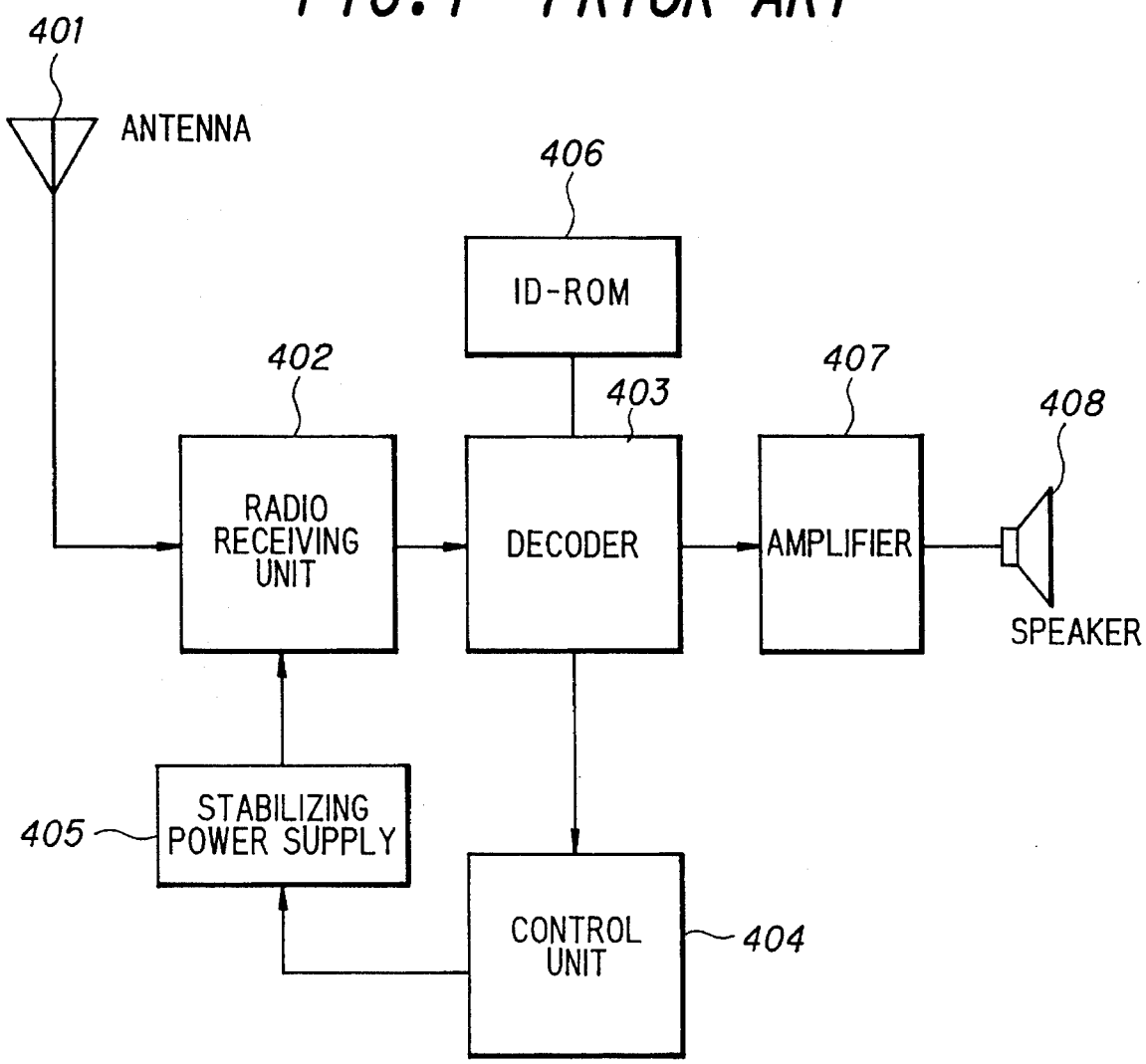
FIG. 1 is a block diagram showing a conventional paging receiver.

FIG. 1 shows the conventional paging receiver which comprises a radio receiving unit 402 for receiving a signal received by an antenna 401 and generating an intermediate signal to be then demodulated therein, a decoder 403 for decoding a signal demodulated in the radio receiving unit 402 to provide an ID code to be compared with an assigned ID code and generating an alert signal in accordance with the coincidence of the ID codes, a control unit 404 for generating a control signal by receiving a synchronization code from the decoder 403, a stabilizing power supply 405 for applying a voltage to the radio receiving unit 402 by receiving the control signal from the control unit 404, an ID-ROM 406 storing an ID-code assigned to the paging receiver, and an amplifier 407 for amplifying the alert signal supplied from the decoder 403 and supplying the amplified alert signal to a speaker 408.

In operation, it is assumed that the Radio Paging Code No. 1 which is adopted in CCIR REQ584-1 is used in the paging receiver.

Figure 2:
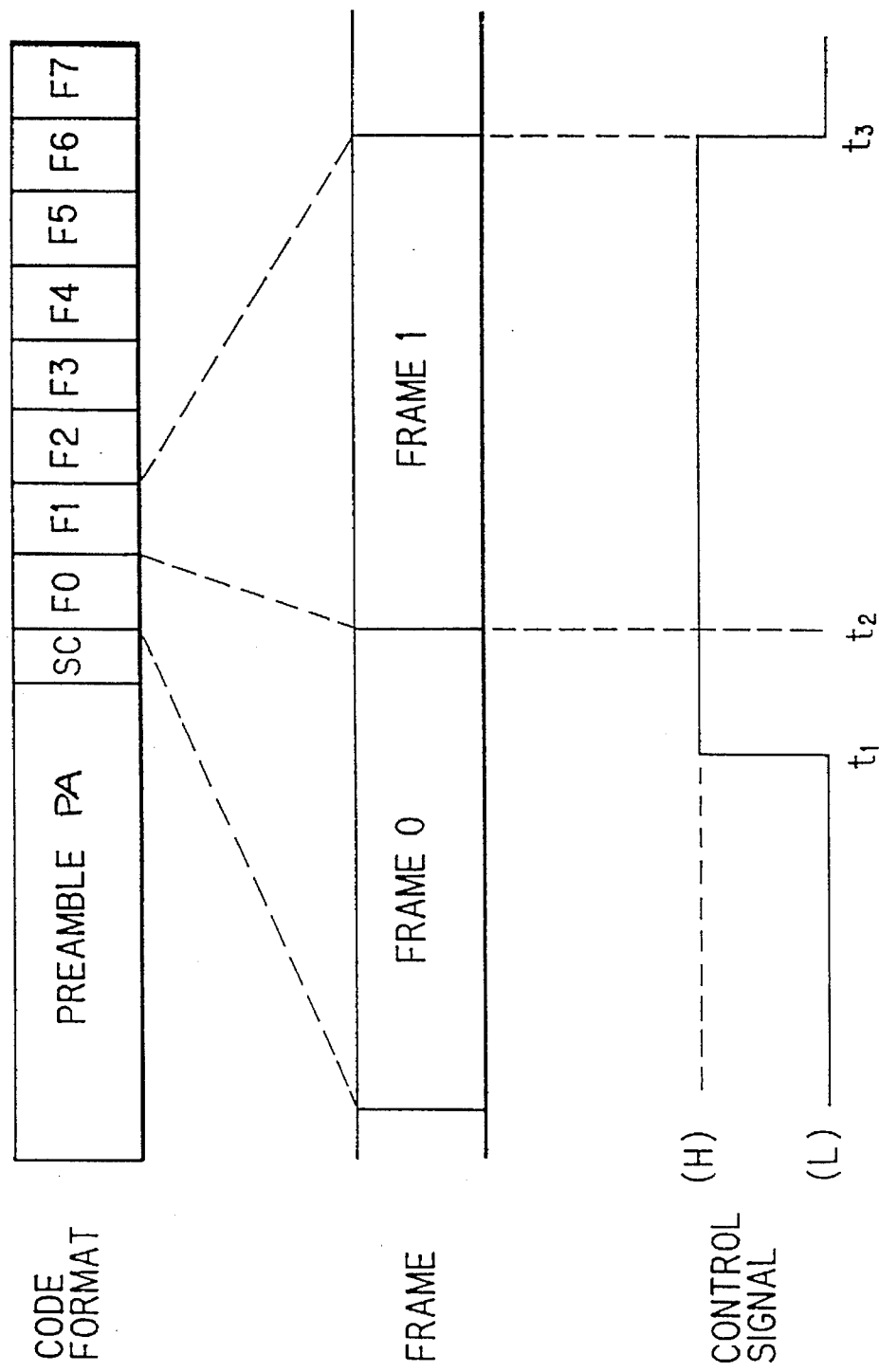
FIG. 2 is a timing chart explaining operation in which a voltage is applied from a power supply to a radio receiving unit in the paging receiver in FIG. 1.

First, a transmitted signal of a code format as shown in FIG. 2 is supplied from the antenna 401 to the radio receiving unit 402, in which the transmitted signal is demodulated in accordance with a voltage intermittently supplied from the stabilizing power supply 405 thereto, so that a preamble PA of 576 bits and a synchronization code SC of 32 bits are decoded in the decoder 403 in accordance with the demodulated signal supplied from the radio receiving unit 402. The preamble PA and the synchronization code SC are supplied from the decoder 403 to the control unit 404, so that the bit synchronization is set up by the preamble PA, and the frame synchronization is set up by the synchronism signal SC. Subsequently to the preamble PA and the synchronization signal SC, frames F0 to F7 are transmitted, wherein the frame F1 is assigned to the paging receiver as shown in FIG. 2. When a predetermined time is elapsed after the setting-up of the frame synchronization, a control signal having a fixed ready period ($t_1$ to $t_2$) and an intermittent receiving operation period ($t_2$ to $t_3$) as shown in FIG. 2 is supplied from the control unit 404 to the stabilizing control unit 405, so that a voltage is applied from the stabilizing power supply 405 to the radio receiving unit 402 during the high state ($t_1$ to $t_3$) of the control signal. Thus, a power supply voltage is risen-up to be applied to a RF amplifier, a local oscillator, a demodulator, etc. in the radio receiving unit 402 during the ready period ($t_1$ to $t_2$), so that a selective call signal of the frame F1 is demodulated in the radio receiving unit 402 during the operation period ($t_2$ to $t_3$). The demodulated selective call signal is then supplied to the decoder 403 during that period, and is decoded therein to provide the transmitted ID code which is then compared with the assigned ID code read from the ID-ROM 406. When the ID codes are coincided with each other, an alert signal is generated in the decoder 403, and the alert signal is supplied to the amplifier 407, from which the amplified alert signal is supplied to the speaker 408. Thus, alert sound is generated for a user carrying the paging receiver by the speaker 408.

As described before, the ready period ($t_1$ to $t_2$) is fixed to have an appropriate margin of time common to paging receivers having different rising-up properties. As a result, the aforementioned disadvantage is observed in the conventional paging receiver.

Next, a paging receiver in the preferred embodiment according to the invention will be explained.

Figure 3:
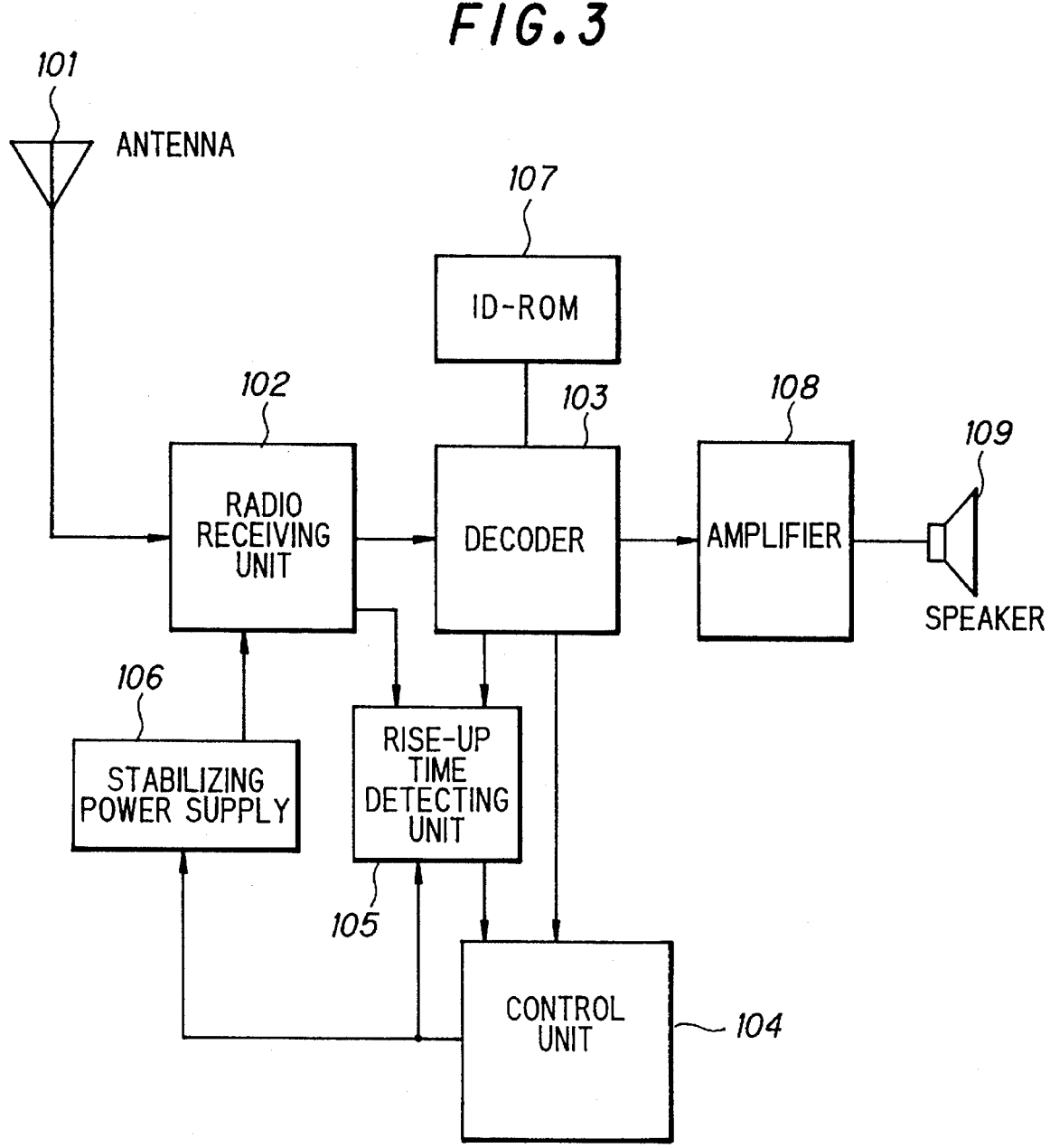
FIG. 3 is a block diagram showing a paging receiver in a preferred embodiment according to the invention.

FIG. 3 shows the paging receiver which comprises a radio receiving unit 102 receiving a signal from an antenna 101, a decoder 103, a control unit 104, a rise-up time detecting unit 105, a stabilizing power supply 106, an ID-ROM 107, an amplifier 108, and a speaker 109, wherein the blocks other than the rise-up time detecting unit 105 operate in the same manner as in the conventional paging receiver in FIG. 1.

Figure 4:
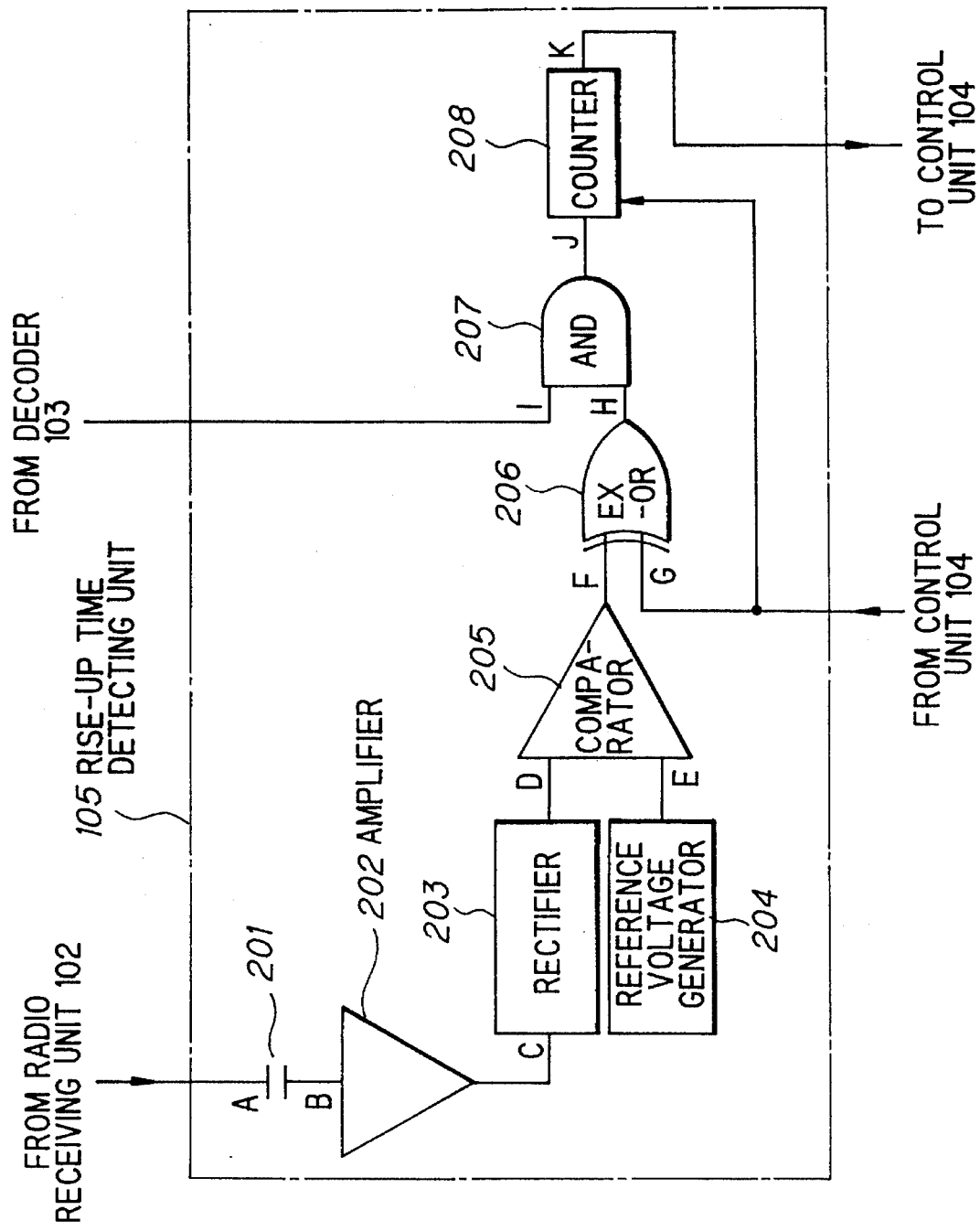
FIG. 4 is a block diagram showing a rise-up time detecting unit in the paging receiver in the preferred embodiment.

FIG. 4 shows the rise-up time detecting unit 105 which comprises a capacitor 201 for passing an AC component of a signal supplied from the radio receiving unit 102 to remove a DC component thereof, an amplifier 202 for amplifying the AC component signal, a rectifier 203 for rectifying the amplified signal to provide a rectified signal, a reference voltage generator 204 for generating a reference voltage, a comparator 205 for comparing the rectified signal and the reference voltage, an exclusive OR circuit 206 for carrying out the logic calculation of exclusive OR between an output signal of the comparator 205 and a control signal supplied from the control unit 104, an AND circuit 207 for passing a clock signal when an output signal of the exclusive OR circuit 206 is high, and a counter 208 for counting the pulse number of the clock signal passed through the AND circuit 207 to supply the counted number to the control unit 104.

Figure 5:
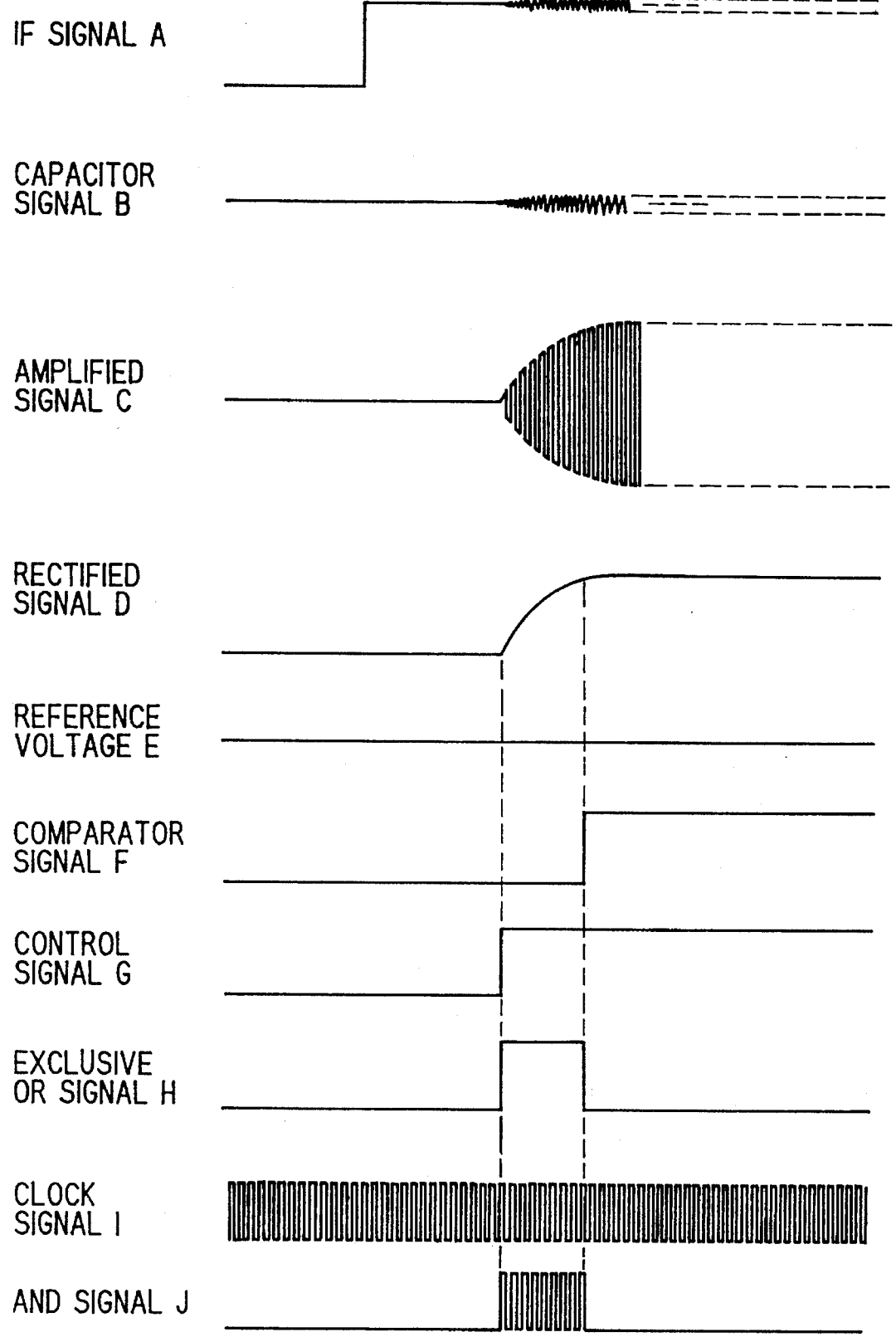
FIG. 5 is a timing chart showing operation in the rise-up time detecting unit.

Operation of the rise-up time detecting unit 105 will be explained in FIG. 5. An intermediate frequency (IF) signal A is generated in a local oscillator (not shown) in the radio receiving unit 102, and the IF signal A is supplied to the capacitor 201 in the rise-up time detecting unit 105, so that the capacitor signal B which is an AC component of the IF signal A is supplied from the capacitor 201. The capacitor signal B is amplified in the amplifier 202, from which an amplified signal C is supplied to the rectifier 203, so that the rectified signal D is supplied to the first input of the comparator 205, to the second input of which a reference voltage E is supplied from the reference voltage generator 204. Thus, a comparator signal F which is high at the time when the rectified signal D is greater than the reference voltage E is supplied from the comparator 205. The comparator signal F and the control signal G supplied from the control unit 104 are supplied to the exclusive OR circuit 206, so that an exclusive OR signal H is generated therein. As shown in FIG. 5, the exclusive OR signal is high, when the control signal G is high, and the comparator signal F is low. The exclusive OR signal H is supplied to the AND circuit 207, so that the clock signal I is passed through the AND circuit 207 to be supplied to the counter 208 as an AND signal J, when the exclusive OR signal H is high. Thus, the pulse number of the AND signal J is counted in the counter 208. The counted number is a rise-up time signal to be supplied to the control unit 104, in which a timing of supplying the control signal G to the stabilizing power supply 106 (and also to the rise-up time detecting circuit 105) is determined in accordance with the rise-up time (the counted number) and a setting-up timing of the frame synchronization.

Figure 6:
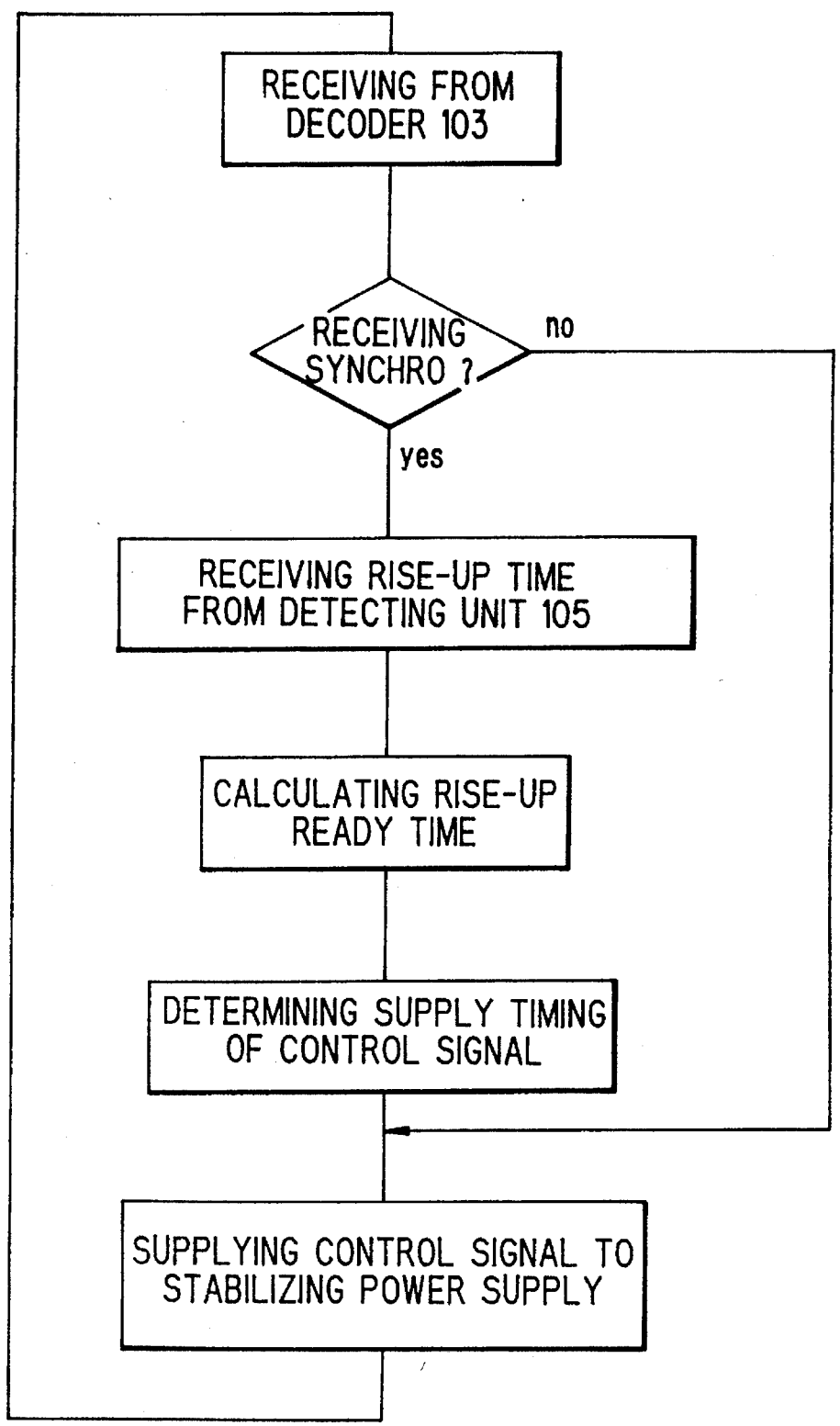
FIG. 6 is a flow chart showing operation in which a voltage is applied from a power supply to a radio receiving unit in the paging receiver in the preferred embodiment.

The timing of supplying the control signal G to the stabilizing power supply 106 will be explained in more detail in FIG. 6.

The control unit 104 receives a signal representing the setting-up timing of the frame synchronization from the decoder 103, in which the synchronization signal SC is decoded. Then, the control unit 104 receives the rise-up time (the counted number) from the rise-up time detecting unit 105. Thus, a ready period (corresponding to a period of $t_1$ to $t_2$ in FIG. 2) of the control signal G is calculated in the control unit 104 by using the rise-up time. Then, a timing of supplying the control signal G having the calculated ready period to the stabilizing power supply 105 is determined in the control unit 104 in accordance with the setting-up timing of the frame synchronization and the ready period of the control signal G. In more detail, a frame in which an intermittent receiving operation is carried out is determined on the basis of the setting-up timing of the frame synchronization, and a timing of supplying the control signal G to the stabilizing power supply 106 is determined in consideration of the calculated ready period of the control signal G and a start timing of the determined frame.

As described above, the electric power consumption of a battery in the stabilizing power supply 106 is decreased, because a timing of supplying the control signal G from the control unit 104 to the stabilizing power supply 106, that is, a turning-on timing of a RF amplifier, a local oscillator, a demodulator, etc. in the radio receiving unit 102 is determined at each time by detecting an actual rise-up time of the radio receiving unit 102, for instance, the local oscillator.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A paging receiver, comprising:
   means for receiving a radio frequency signal to generate a demodulation signal thereof;
   means for processing said demodulation signal to externally represent information included in said radio frequency signal; and means for controlling the operation of said receiving means to be intermittently turned on, said receiving means being turned on for a period including a rise-up time and a receiving time, said rise-up time being detected by said controlling means, and said receiving time being successively subsequent to said rise-up time.

2. A paging receiver, comprising:

a radio receiving unit for generating a demodulated signal by demodulating an intermediate frequency signal obtained by mixing a local oscillation signal generated in a local oscillator and a transmitted radio signal;

a decoder for decoding said demodulated signal to generate a decoded signal, said decoded signal including a synchronization code and an ID code;

means for representing information in accordance with said ID code in said decoded signal;

means for detecting a rise-up time of said local oscillator; and means for controlling the operation of said radio receiver unit to be intermittently turned on such that said radio receiving unit is turned on for a period including said rise-up time and a prescribed selective receiving time.

3. A paging receiver, according to claim 2, wherein:

said control means, comprises:

a control signal generator for generating a control signal, a timing of generating said control signal being determined by said rise-up time, a timing of a frame synchronization set up by said synchronization code, and a start timing of said prescribed selective receiving time; and a power supply for supplying a voltage to said radio receiving unit to be thereby turned on by receiving said control signal.

4. A paging receiver, according to claim 2, wherein:

said detecting means, comprises:

a comparator for detecting a period for which said intermediate frequency signal is greater than a reference voltage; and a counter for counting a pulse number of a clock signal for said period to provide a counted number as said rise-up time.

\* \* \* \* \*